P. SEILER.
SYNCHRONIZING DEVICE FOR PICTURE MACHINES AND PHONOGRAPHS.
APPLICATION FILED OCT. 7, 1908.
939,337.
Patented Nov. 9, 1909.
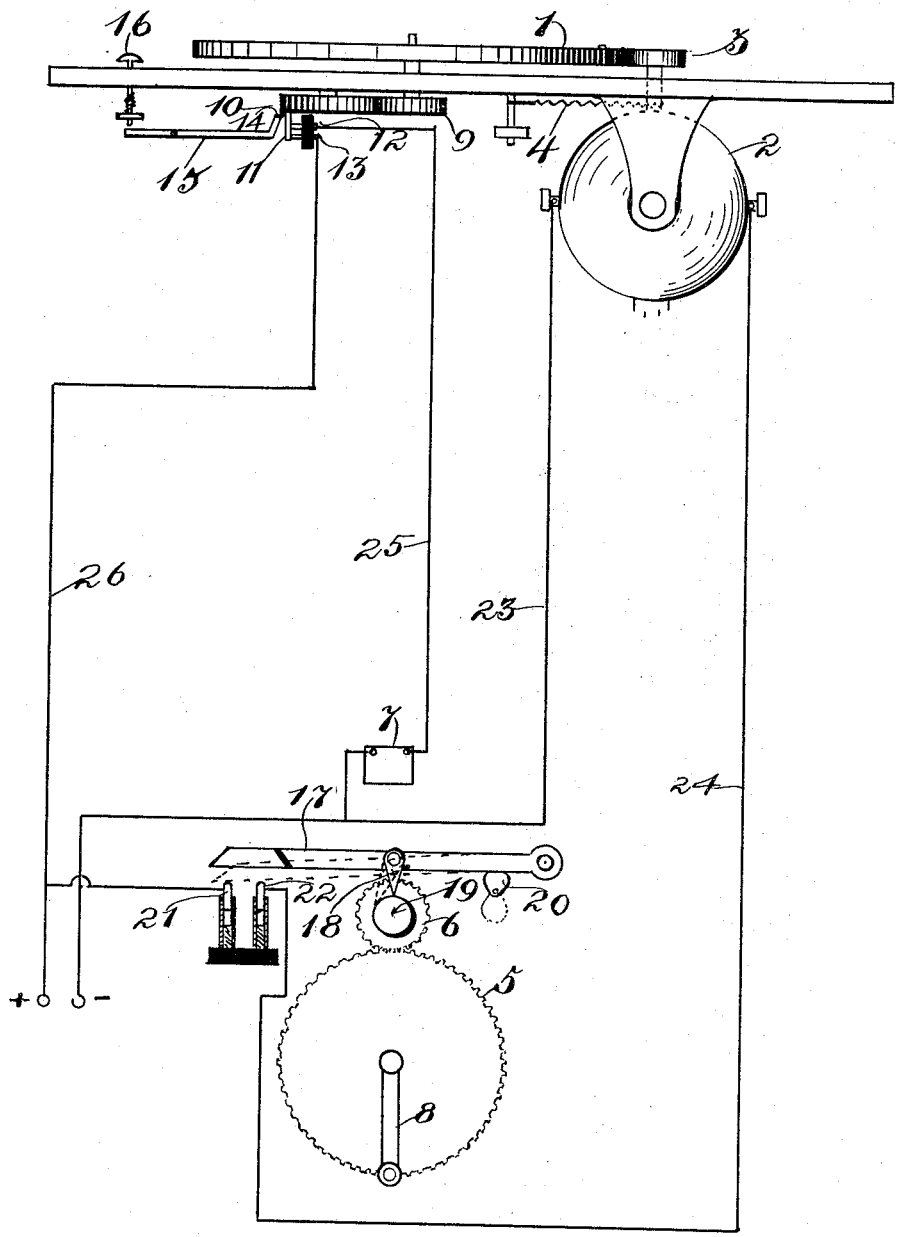

UNITED STATES PATENT OFFICE.

PAUL SEILER, OF OAKLAND, CALIFORNIA, ASSIGNOR OF ONE-HALF TO SAMUEL JOSEPH JOHNS, OF SAN FRANCISCO, CALIFORNIA.

SYNCHRONIZING DEVICE FOR PICTURE-MACHINES AND PHONOGRAPHS.

939,337.  Specification of Letters Patent.  Patented Nov. 9, 1909.

Application filed October 7, 1908. Serial No. 456,554.

*To all whom it may concern:*

Be it known that I, PAUL SEILER, a citizen of the United States, residing at Oakland, in the county of Alameda and State of California, have invented a new and useful Synchronizing Device for Picture-Machines and Phonographs, of which the following is a specification in such full and clear terms as will enable those skilled in the art to construct and use the same.

My invention relates to the art of operating together phonographs and moving picture machines.

Phonographs are operated by motors; picture machines by hand; and the primary object of my invention is to provide means for enabling an operator to operate a picture machine in accurate correspondence with the song sung or speech spoken by its corresponding phonograph record. When a picture film is made along with a phonograph record, there is a certain ratio maintained between the revolutions of the phonograph plate upon which the record rests, and the length of film passing through the picture machine; and in all reproductions, the same ratio must be maintained. If thirteen exposures of the film correspond to one revolution of the phonograph plate when the film and record are being prepared, then thirteen exposures of the film must be shown for every revolution of the plate when the record and film are exhibited. If the ratio between the rotation of the plate and the rotation of the crank of the picture machine were unity, it would be easy to signify to the operator the speed for operating his machine by causing every revolution of the plate to mark itself by an audible signal, with which the operator could keep time in his crank movements. But the ratio is seldom or never unity. Especially in the case of records and films made in foreign countries used on machines made in the United States; for in this country, while the picture machines expose sixteen pictures for one revolution of the crank, the phonograph plate completes a revolution while thirteen exposures are being made. This being understood it will be clear how I accomplish my objects, which I do by the means illustrated in the accompanying drawing, which is a partly diagrammatic view of my invention, together with such parts of a phonograph and a moving picture machine, as are necessary to show its application thereto.

In the drawing 1 is the plate of a phonograph, and 2, the driving motor. The plate is driven by a friction gear 3 bearing on its periphery, and held against the same by a spring 4.

5 and 6 represent the driving gear of a moving picture machine, and 7 is an electromagnetic ticker, arranged to give an audible click at the moment of closing the circuit.

The picture machine is operated by the crank 8, and said machine may be at any distance from the phonograph, as the length of a large auditorium.

A gear wheel 9 is arranged concentrically with the plate 1 and is rotated thereby. A second gear 10 meshes with gear 9, and bears to gear 9 the ratio which the desired periodicity of the picture machine bears to the periodicity of the plate.

Gear 10 carries a contact piece 11, which closes momentarily at every revolution, the contacts 12, 13, closing the circuit through the ticker 7, which is located near the ear of the picture machine operator. Gear 10 also carries a lug 14 which, on the elevation of lever 15 by the depression of button 16, enables the phonograph to be stopped at a definite starting point, which is always such as to bring the beginning of the record directly under the needle, and the contact piece 11 just at the point of closing contacts 12 and 13.

In the operation of the combined phonograph and moving picture machine, the phonograph is first set as above described. The picture machine is set by resting the support 18 which is loosely pivoted to lever 17, on the disk 19 at a point directly above its center. A cam 20 normally secures lever 17 in the position shown while the machine is out of operation, and is dropped down into the position shown by the dotted lines when the machine is about to be operated, the support 18 holding lever 17 until disk 19 is moved. While cam 20 is in operative position the picture film is moved into its starting position by crank 8. Thereafter, cam 20 is dropped out of engagement with lever 17, and said lever is held up by support 18. Both the phonograph and the picture machine are now set, and ready to start. They must both start at the same instant, and they do so at the slightest movement of the crank 8 in a clockwise direction; for such a movement will turn disk 19 in a counter clockwise direction and drop the support 18 into the position shown by dotted lines. Lever 17 falls across and closes contacts 21 and 22, which starts motor 2 through circuit 23, and 24, at the same time giving current to circuit 25 and 26. At the same instant a click is given off by ticker 7, and the click is repeated at every revolution of gear 10. The operator turns crank 8 in time with the rhythmical clicks, and the pictures on the film are exposed in accurate correspondence with the song or speech on the record.

By using the proper ratio between gear wheels 9 and 10, films and records adapted to various machines may be operated on any other machine.

Having described my invention what I claim as new and desire to secure by Letters Patent of the United States, is:

1. In a combination picture machine and phonograph apparatus, a motor circuit, a ticker circuit, and means for simultaneously closing said circuits.

2. In a combination picture machine and phonograph apparatus, a motor circuit, a ticker circuit, a phonograph, a picture machine a rhythmical make and break device in said ticker circuit, and means on said picture machine for simultaneously closing said circuits.

3. In a combination picture machine and phonograph apparatus, a picture machine, a phonograph, a motor circuit, a ticker circuit, a rhythmical make and break device in said ticker circuit, means for independently setting said picture machine, rhythmical make and break device, and phonograph at their respective starting points, and means for closing said circuits simultaneously.

In testimony whereof I have set my hand this 29th day of September A. D. 1908, in the presence of the two subscribed witnesses.

PAUL SEILER.

Witnesses:
 FRANK P. MEDINA,
 A. L. FISH.